United States Patent
Huang et al.

(10) Patent No.: US 7,106,422 B2
(45) Date of Patent: Sep. 12, 2006

(54) RANGEFINDER AND MEASURING METHOD

(75) Inventors: Jui-Feng Huang, Tanzih, Taichung (TW); Lung-Pin Chung, Tanzih, Taichung (TW); Kuo-Hua Yang, Tanzih, Taichung (TW); Ai-Ling Lin, Tanzih, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 239 days.

(21) Appl. No.: 10/875,774

(22) Filed: Jun. 24, 2004

(65) Prior Publication Data

US 2005/0134832 A1    Jun. 23, 2005

(30) Foreign Application Priority Data

Dec. 19, 2003   (TW) .............................. 92136130 A

(51) Int. Cl.
*G01B 11/00* (2006.01)

(52) U.S. Cl. .................. 356/4.01; 356/3.01; 356/4.01; 356/5.01

(58) Field of Classification Search ............... 356/4.01
See application file for complete search history.

(56) References Cited

U.S. PATENT DOCUMENTS 5,291,262 A * 3/1994 Dunne ....................... 356/5.06
5,691,808 A * 11/1997 Nourrcier et al. .......... 356/5.01
6,313,464 B1 * 11/2001 Schrader .................... 250/349

* cited by examiner

Primary Examiner—Thomas H. Tarcza
Assistant Examiner—Luke D. Ratcliffe
(74) Attorney, Agent, or Firm—Thomas, Kayden, Horstemeyer & Risley

(57) ABSTRACT

A Rangefinder capable of long and short distance measurement in company with compass measurement. The rangefinder includes distance measurement unit, a compass sensing unit and a processor. The rangefinder can selectively execute a comparison mode or a gain mode. The comparison mode is executed during short-distance measurement and the gain mode is executed during long-distance measurement. The compass measurement unit senses a terrestrial magnetism to obtain first and second magnetic sensing signals. The processor estimates a distance between the target and the rangefinder according to the measurement signal from the distance measurement unit and determines a compass orientation of the target according to the first and second magnetic sensing signals.

12 Claims, 9 Drawing Sheets

RANGEFINDER AND MEASURING METHOD

BACKGROUND OF THE INVENTION

1. Field of the Invention

The present invention relates to a rangefinder, and more particularly, to a rangefinder capable of both short-distance, long-distance, and compass measurements, and measuring method thereof.

2. Description of the Related Art

In conventional pulse laser rangefinders, noise of current is produced while processing the measurement. After converting the noise of current to time domain, the noise of current usually results 7~10 meters error or so from the incorrect measurement of rangefinders such that noise and true signals cannot be differentiated within 10 meters. To solve this problem, small signal noise can be eliminated using a high reference voltage level provided by a single comparator. However, this method also eliminates the small signal pulse needed for long-distance measurement, hence a distant target cannot be measured. Further, users usually be interested in obtaining other measurement parameters, such as compass orientation or others when measuring the distance between the target and the rangefinder.

SUMMARY OF THE INVENTION

It is therefore an object of the present invention to provide a rangefinder capable of both long- and short-distance measurement, in particularly with compass measurement function, and measuring method thereof.

According to the above mentioned object, the present invention provides a rangefinder capable of compass measurement. In the rangefinder, a transmitter transmits a light beam to a target, and a receiver receives the reflected light beam returning from the target and outputs a corresponding distance signal. A comparison circuit compares the distance signal with a reference voltage level to determine whether a pulse in the distance signal is higher than the reference voltage level. A gain circuit receives the distance signal from the receiver to amplify and output a corresponding amplified signal. A compass measurement unit senses a terrestrial magnetism to obtain a first magnetic sensing signal and a second magnetic sensing signal. A processor estimates a distance between the target and the rangefinder according to the pulse or the amplified signal and determines a compass orientation of the target according to the first and second magnetic sensing signals.

According to the above mentioned object, the present invention also provides a measurement method for the rangefinder.

First, a first light beam is transmitted to a target by a transmitter. A light beam reflected from the target is then received and a corresponding first distance signal is output by a receiver. It is then determined whether a pulse in the first distance signal is higher than a reference voltage level. When the pulse is higher than the reference voltage level, the pulse is output to the processor to execute operational processes for estimating distance between the target and the rangefinder. When no pulse in the first distance signal is higher than the reference voltage level, a second light beam is transmitted to the target, and a second distance signal is output according to the light beam reflected from the target again. The second distance signal is then amplified and output to the processor to execute the operational process for estimating distance between the target and the rangefinder. Next, a terrestrial magnetism is sensed by a compass measurement unit to obtain a first magnetic sensing signal and a second magnetic sensing signal. A compass orientation of the target is then determined according to the first and second magnetic sensing signals. Finally, the estimated distance between the target and the rangefinder and the determined compass orientation of the target are displayed on a display unit.

The feature of the present invention resides in that the comparison mode is applied to measure the short distance target, and the gain mode is applied to measure the long distance target. Therefore, the rangefinder of the present invention enables measurement of both long and short distances. Another feature of the present invention resides in that the compass measurement unit is applied to measure the terrestrial magnetism. Therefore, the rangefinder can also obtain compass orientation of the measured target.

BRIEF DESCRIPTION OF THE DRAWINGS

The present invention can be more fully understood by the subsequent detailed description and examples with reference made to the accompanying drawings, wherein:

FIG. 5 is a circuit diagram of the channel selection circuit shown in FIG. 3a;

DETAILED DESCRIPTION OF THE INVENTION

The method and device for light signal reception of the present invention applicable to rangefinders is described in the following.

Figure 1:
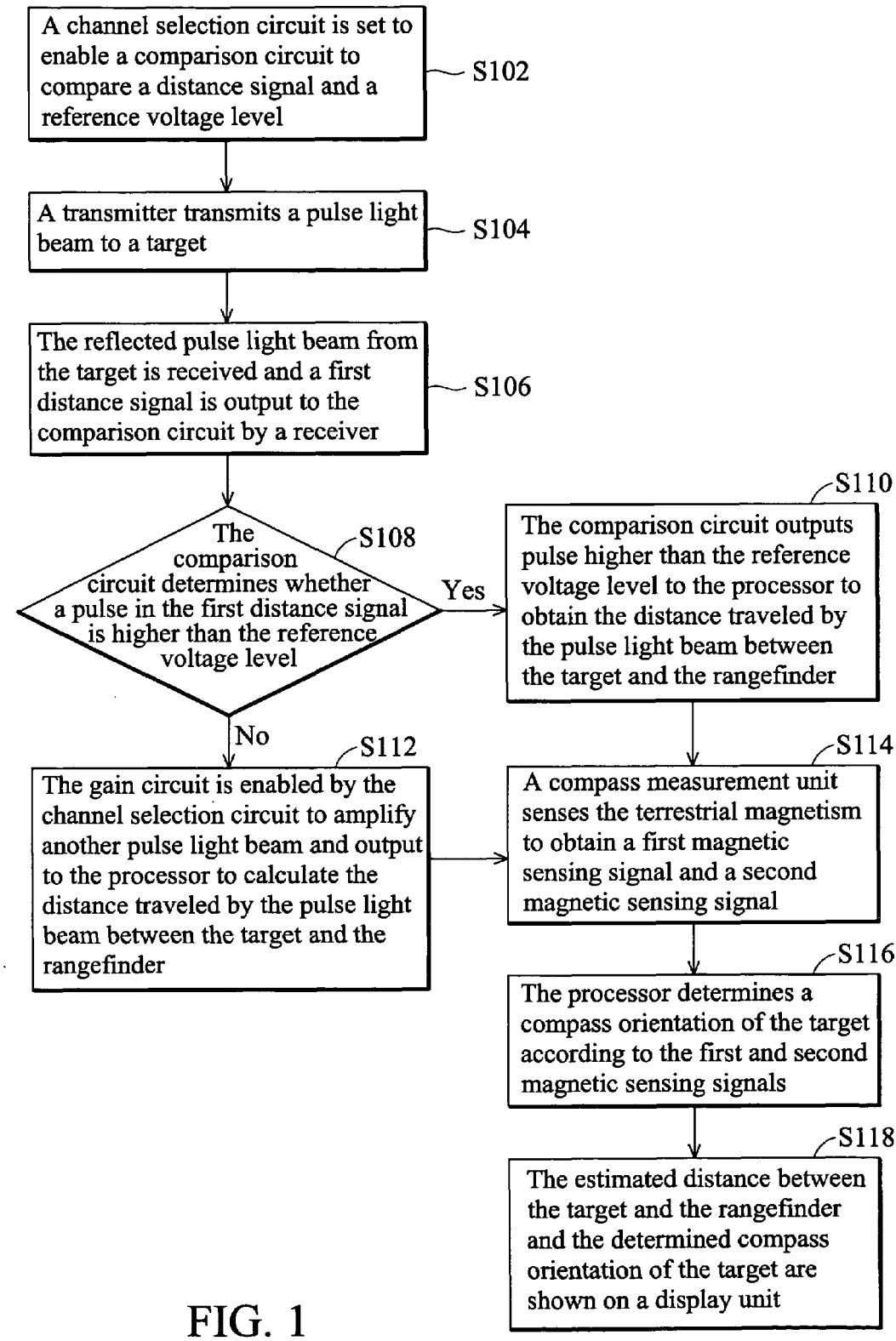
FIG. 1 is a flowchart of the measurement method according to the present invention.

FIG. 1 is a flowchart of the measurement method according to the present invention. First, a channel selection circuit is set to enable a comparison circuit to compare a distance signal and a reference voltage level in step S102. The reference voltage level is slightly higher than the spike noise voltage which is produced simultaneously when the pulse signal is transmitted by a transmitter. Consequently, the spike noise is eliminated by the comparison circuit. Next, in step S104, the transmitter transmits a pulse light beam to a target, and the target reflects the pulse light beam. A receiver receives the reflected pulse light beam and outputs a first distance signal to the comparison circuit and the gain circuit in step S106. In step S108, the comparison circuit then determines whether the pulse is higher than the reference voltage level, in the first distance signal. Next, in step S110, the comparison circuit outputs any received pulses higher than the reference voltage level to a processor. Consequently, the distance traveled by the pulse light beam between the target and the rangefinder is calculated by processing the higher pulses with a processor. In step S112, the gain circuit is enabled by the channel selection circuit to process another pulse light beam when no pulse in the first distance signal is higher than the reference voltage level. The gain circuit amplifies a second distance signal and output to the processor for calculation of the distance traveled by the pulse light beam between the target and the rangefinder. In step S114, a compass measurement unit senses the terrestrial magnetism to obtain a first magnetic sensing signal and a second magnetic sensing signal. In step S116, the processor then determines a compass orientation of the target according to the first and second magnetic sensing signals. Finally, the estimated distance between the target and the rangefinder and the determined compass orientation of the target are displayed on a display unit in step S118.

Figure 2:
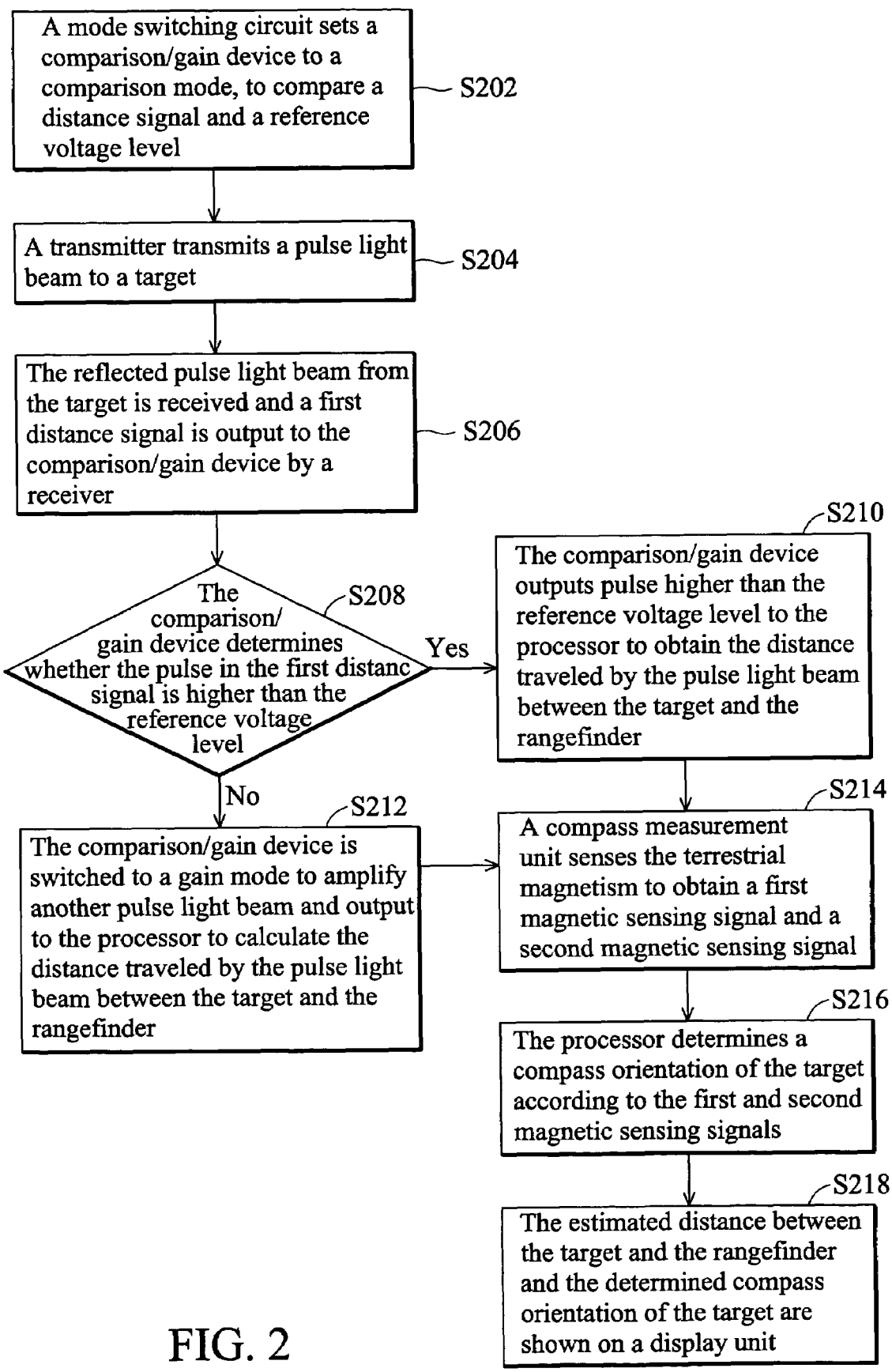
FIG. 2 is another flowchart of the measurement method according to the present invention.

FIG. 2 is another flowchart of a measurement method according to the present invention. First, in step S202, a mode switching circuit sets a comparison/gain device to a comparison mode to compare a distance signal and a reference voltage level. Next, in step S204, the transmitter transmits a pulse light beam to a target, and the target reflects the pulse light beam. A receiver receives the pulse light beam reflected from the target and outputs a first distance signal to the comparison/gain device in step S206. In step S208, the comparison/gain device then determines whether the pulse in the first distance signal is higher than the reference voltage level. Next, in step S210, the comparison/gain device outputs any pulse higher than the reference voltage level to a processor. Consequently, a processor calculates the distance traveled by the pulse light beam between the target and the rangefinder by processing the pulse higher than the reference voltage level. In step S212, the comparison/gain device is switched to gain mode to process another pulse light beam when no pulse in the first distance signal is higher than the reference voltage level. The comparison/gain device amplifies a second distance signal in gain mode and outputs to the processor to calculate the flight distance of the pulse light beam between the target and the rangefinder. Next, a compass measurement unit senses the terrestrial magnetism to obtain a first magnetic sensing signal and a second magnetic sensing signal, in step S224. In step S226, a compass orientation of the target is then determined by the processor according to the first and second magnetic sensing signals. Finally, the estimated distance between the target and the rangefinder and the determined compass orientation of the target are display on a displayed unit in step S228.

First Embodiment

Figure 3A:
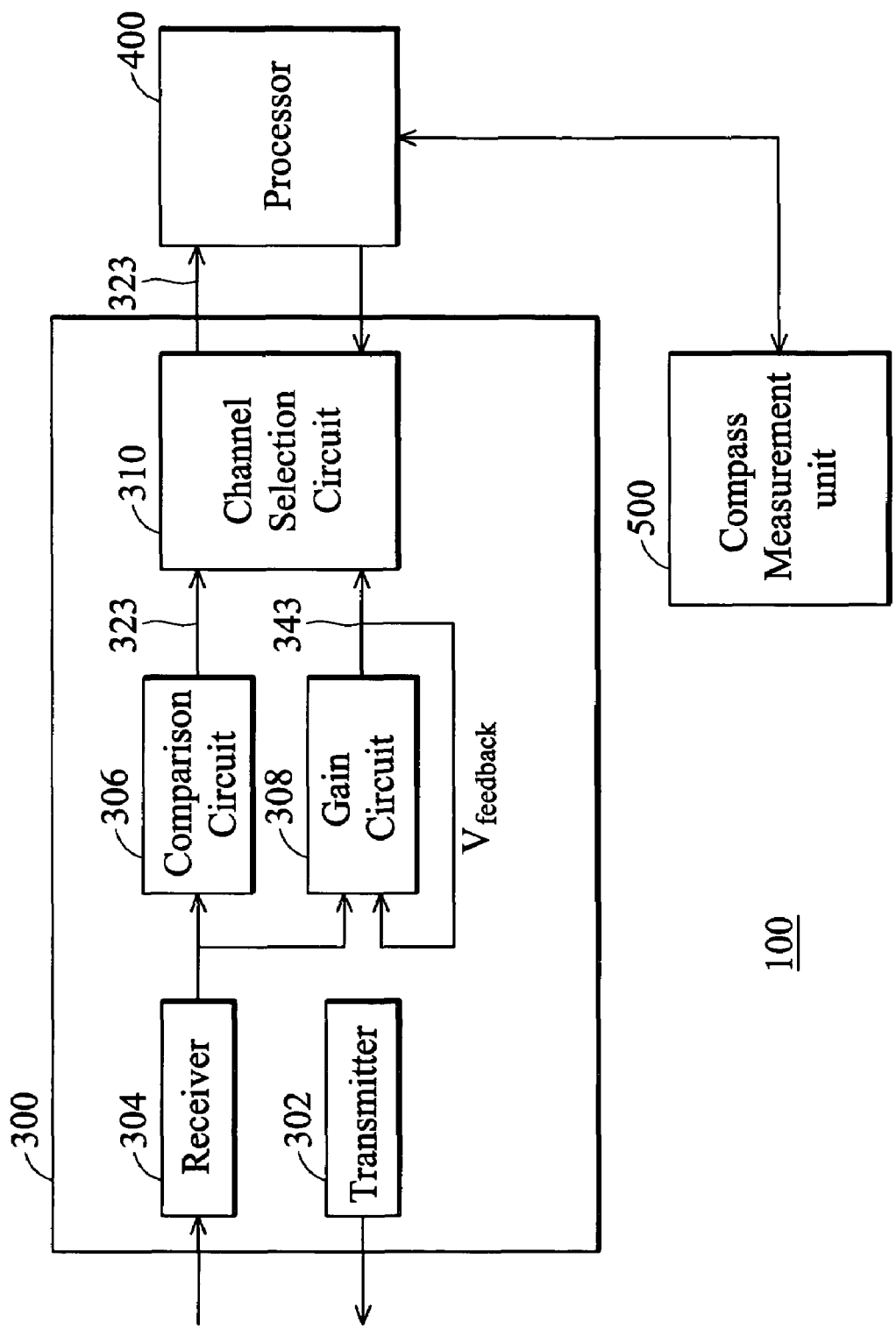
FIG. 3a is a block diagram of the rangefinder according to the flowchart shown in FIG. 1.

FIG. 3a is a block diagram of the rangefinder according to the flowchart shown in FIG. 1. As shown in FIG. 3a, the rangefinder 100 comprises a distance measurement unit 300, a processor 400 and a compass measurement unit 500. The distance measurement unit 300 transmits a pulse light beam to a target and receives the reflected pulse light beam from the target for measuring the distance between the target and the rangefinder, and the compass measurement unit 500 senses the terrestrial magnetism to obtain two compass sensing signals for measuring the compass orientation of the target.

As shown in FIG. 3a, the distance measurement unit 300 comprises a transmitter 302, a receiver 304, a comparison circuit 306, a gain circuit 308 and a channel selection circuit 310. The transmitter 302 transmits pulse light beams to a target, and the target reflects the pulse light beams. The receiver 304 receives the pulse light beams reflected from the target, and outputs corresponding distance signals to the comparison circuit 306 and the gain circuit 308. In the present invention, the pulse light beam can be a laser light beam.

Figure 4A:
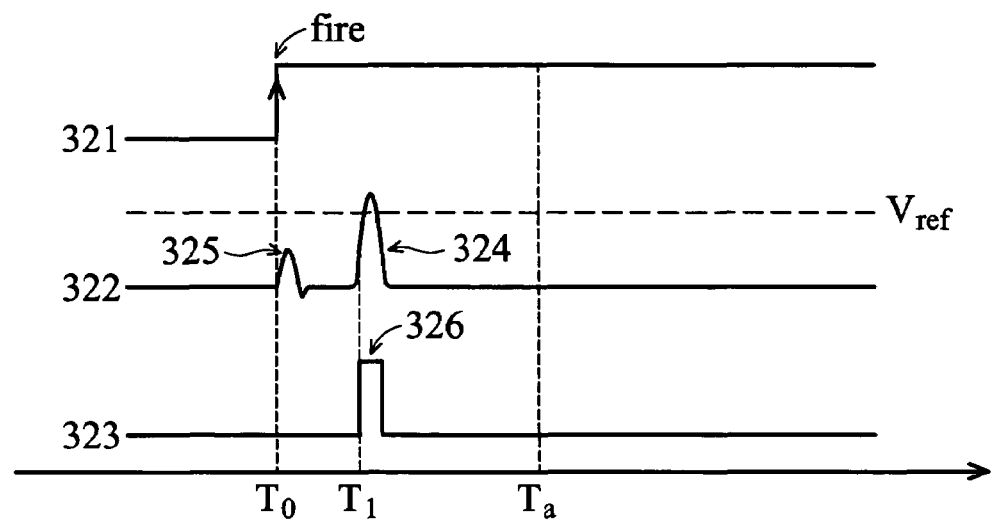
FIG. 4a is a timing chart output from the comparison circuit.

The comparison circuit 306 has a reference voltage level $V_{ref}$. The reference voltage level is slightly higher than spike noise voltage level. The spike noise is produced simultaneously when pulse signal is transmitted from the transmitter 302. Consequently, the spike noise is eliminated by the comparison circuit 306. FIG. 4a is a timing chart output from the comparison circuit 306. As shown in FIG. 4a, the signal 321 is a pulse signal transmitted to the target from the transmitter 302 at time $T_0$. The distance signal 322 has a spike noise 325 after time $T_0$. The comparison circuit 306 receives the distance signal 322 and outputs the signal 323. Namely, the signal 323 is the output wave of the comparison circuit 306 after receiving the distance signal 322. In the comparison circuit 306, pulses smaller than the reference voltage level $V_{ref}$ are eliminated when the distance between the target and the rangefinder is within 30 meters. Consequently, the signal 323 only includes pulse 326 without spike noise 325. The pulse light beam reflected from the target can maintain considerable energy intensity if the distance between the target and the rangefinder is within 30 meters. Thus, the distance signal 322 output from the receiver 304 may have a target pulse 324 higher than the reference voltage level $V_{ref}$.

Initially, the channel selection circuit 310 connects to the comparison circuit 306 such that the signal 323 output from comparison circuit 306 can be transferred to a processor 400. Consequently, the processor 400 determines whether a reflected pulse light beam from the target is received by the receiver 304 during time $T_a$, and calculates the distance between the target and the rangefinder. The processor 400 enables the channel selection circuit 310 to connect to the gain circuit 308 when the channel selection circuit 310 has no output or the processor 400 cannot obtain the distance between the target and the rangefinder.

Figure 4B:
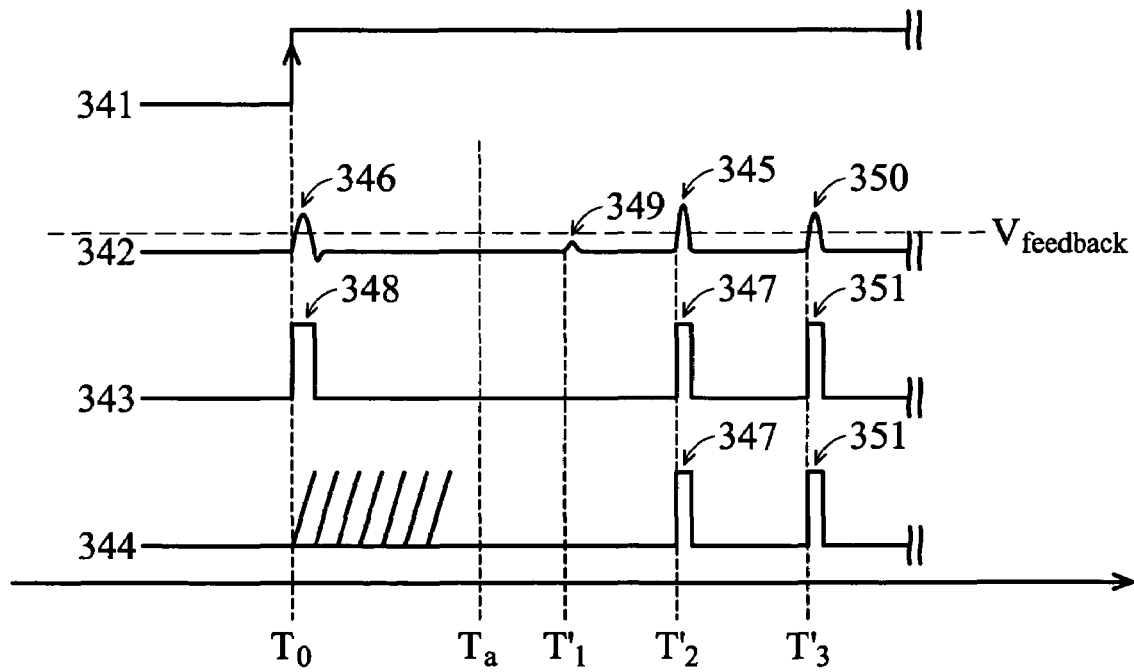
FIG. 4b is a timing chart output from the gain circuit.

The gain circuit 308 has a feedback voltage level $V_{feedback}$, wherein the feedback voltage level $V_{feedback}$ is provided from the output of the gain circuit 308, and the feedback voltage level $V_{feedback}$ is smaller than the reference voltage level $V_{ref}$. The gain circuit 308 amplifies pulses therethrough non-linearly. FIG. 4b is a timing chart output from the gain circuit 308. The flight time of pulse light beam between the target and the rangefinder exceeds time $T_a$ when the distance between the target and the rangefinder exceeds 30 meters. As shown in FIG. 4b, the signal 341 is a pulse signal transmitted to the target from the transmitter 302 at time T0. The distance signal 342 has spike noise 346 in the proximity of time $T_0$, and the pulses 349, 345 and 350 occur in the distance signal sequentially at time $T'_1$, $T'_2$ and $T'_3$. The pulse 349 is eliminated by the gain circuit 308 because the peak voltage of the pulse 349 is smaller than the feedback voltage level $V_{feedback}$ when the distance signal 342 goes through the gain circuit 308. The pulses 345 and 350 and spike noise 346 are amplified non-linearly by the gain circuit 308. The gain circuit 308 receives the distance signal 342 and outputs the signal 343. Namely, the signal 343 is the output wave of the gain circuit 308 after receiving the distance signal 342. The square waves 348, 347 and 351 are amplifications of the spike noise 346 and the pulses 345 and 350, wherein the square waves 348, 347 and 351 have the same peak voltage level. The signal 343 output from gain circuit 308 can be transferred to the processor 400 to calculate the distance between the target and the rangefinder. In the present invention, the processor 400 accumulates the amplified signal 343 corresponding to the pulse light beams by statistical operation so as to distinguish between the pulse light beam reflected from the target and environment light. During the statistical operation, the processor 400 eliminates the square wave produced before time Ta automatically, such as square wave 348, and calculates the signal 344.

Figure 5:
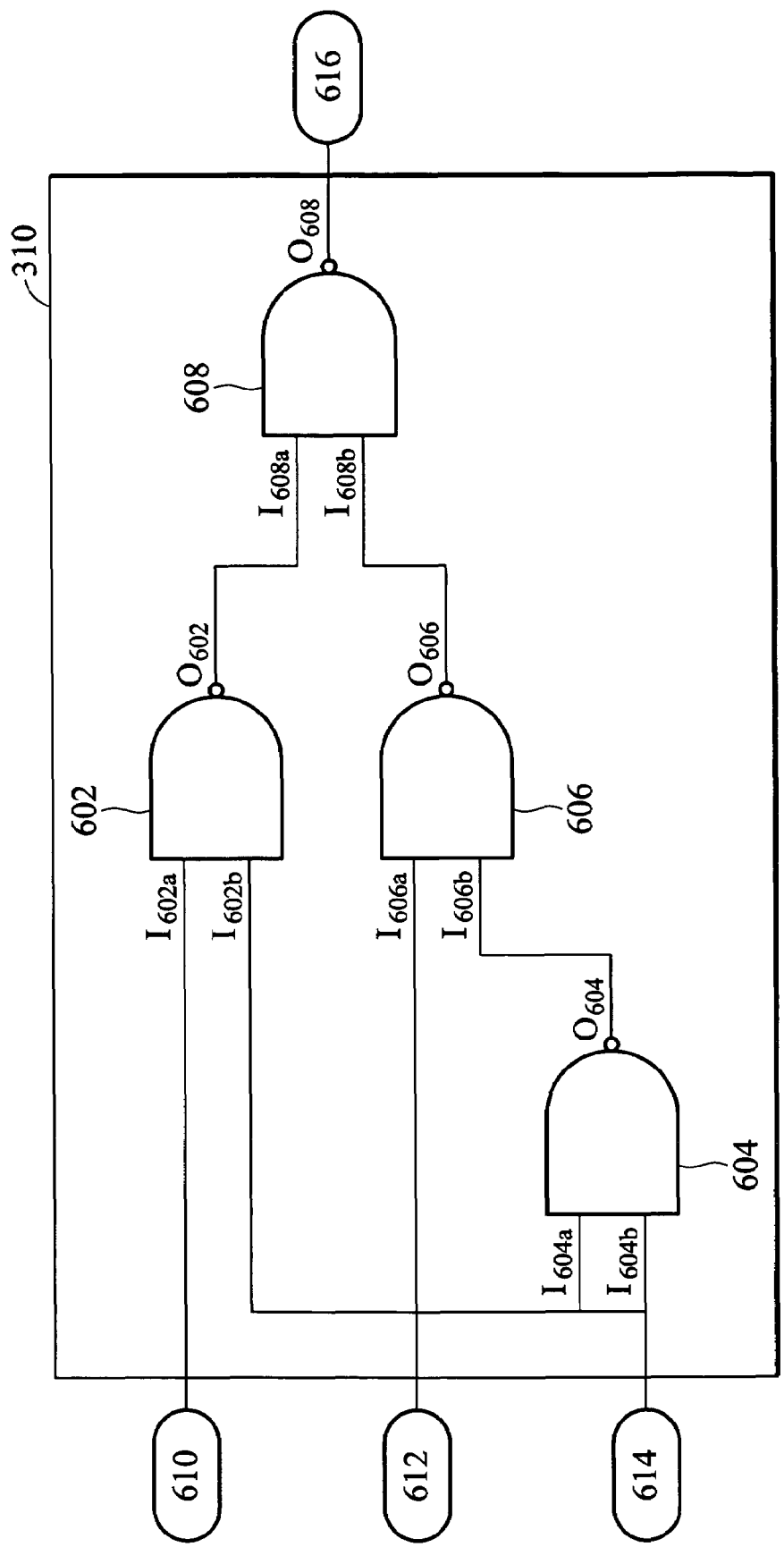

FIG. 5 is a circuit diagram of the channel selection circuit shown in FIG. 3a. As shown in FIG. 3a, the channel selection circuit includes NAND gates 602, 604, 606 and 608. The NAND gate 602 has two input terminals I602a and I602b, and an output terminal O602, wherein the input terminal I602a is coupled to a first channel input terminal 610, and the input terminal I602b is coupled to the channel selection signal input terminal 614. The NAND gate 604 has two input terminals I604a and I604b coupled to the channel selection signal input terminal 614, and an output terminal O604. The NAND gate 606 has two input terminals I606a and I606b, and an output terminal O606, wherein the input terminal I606a is coupled to a second channel input terminal 612, and the input terminal I606b is coupled to the output terminal O604 of the NAND gate 604.

The NAND gate 608 has two input terminals I608a and I608b, and an output terminal O608, wherein the input terminal I608a is coupled to the output terminal O602 of the NAND gate 602, the input terminal I606b is coupled to the output terminal O604 of the NAND gate 606, and the output terminal O608 serves as the output terminal 616 of the channel selection circuit.

The first channel input terminal 610 is coupled to the gain circuit 308 and the second channel input terminal 612 is coupled to the comparison circuit 306 as shown in FIG. 3a. The channel selection circuit 310 connects the first channel input terminal 610 to the gain circuit 308 or connects the second input terminal 612 to the comparison circuit 306 according to the channel selection signal at the channel selection input terminal 614. The output terminal 616 of channel selection circuit 310 is coupled to a processor 400 to estimate distance between the target and the rangefinder by the output signal through the output terminal 608.

Figure 8:
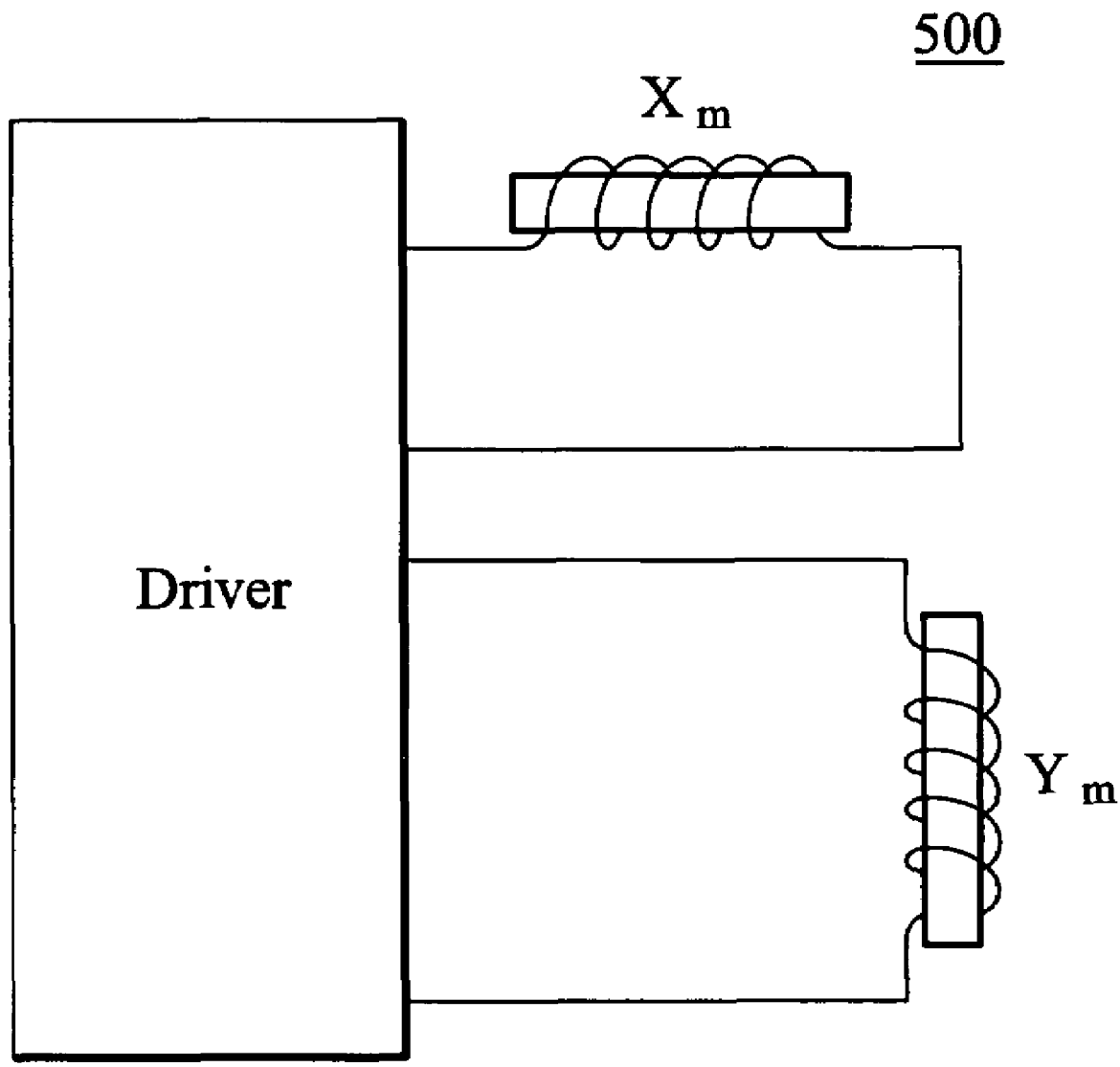
FIG. 8 is diagram of the compass measurement unit according to the present invention.

FIG. 8 is diagram of the compass measurement unit according to the present invention. In the present invention, the compass measurement unit 500 senses the terrestrial magnetism to obtain two compass sensing signals for measuring the compass orientation of the target. As shown in FIG. 8, the compass measurement unit 500 comprises at least two magnetic induction devices $X_m$ and $Y_m$ to induct, sense or interact with the terrestrial magnetism, such as the earth's northern magnetic field, and a driver drives the two magnetic induction devices $X_m$ and $Y_m$. The two magnetic induction devices $X_m$ and $Y_m$ are perpendicular to each other, the magnetic induction devices $X_m$ and $Y_m$ are both parallel to the ground to senses the terrestrial magnetism and outputs first and compass sensing signals. The first and second compass signals are output to the processor 400, and then the processor 400 determines the compass orientation of the target. For example, the compass orientation of the target can be an angle between the direction which the rangefinder towards the target and the true north (earth's northern). Finally, the processor 400 outputs the determined compass orientation and the calculated distance between the target and the rangefinder to display on a display unit (not shown).

Second Embodiment

Figure 3B:
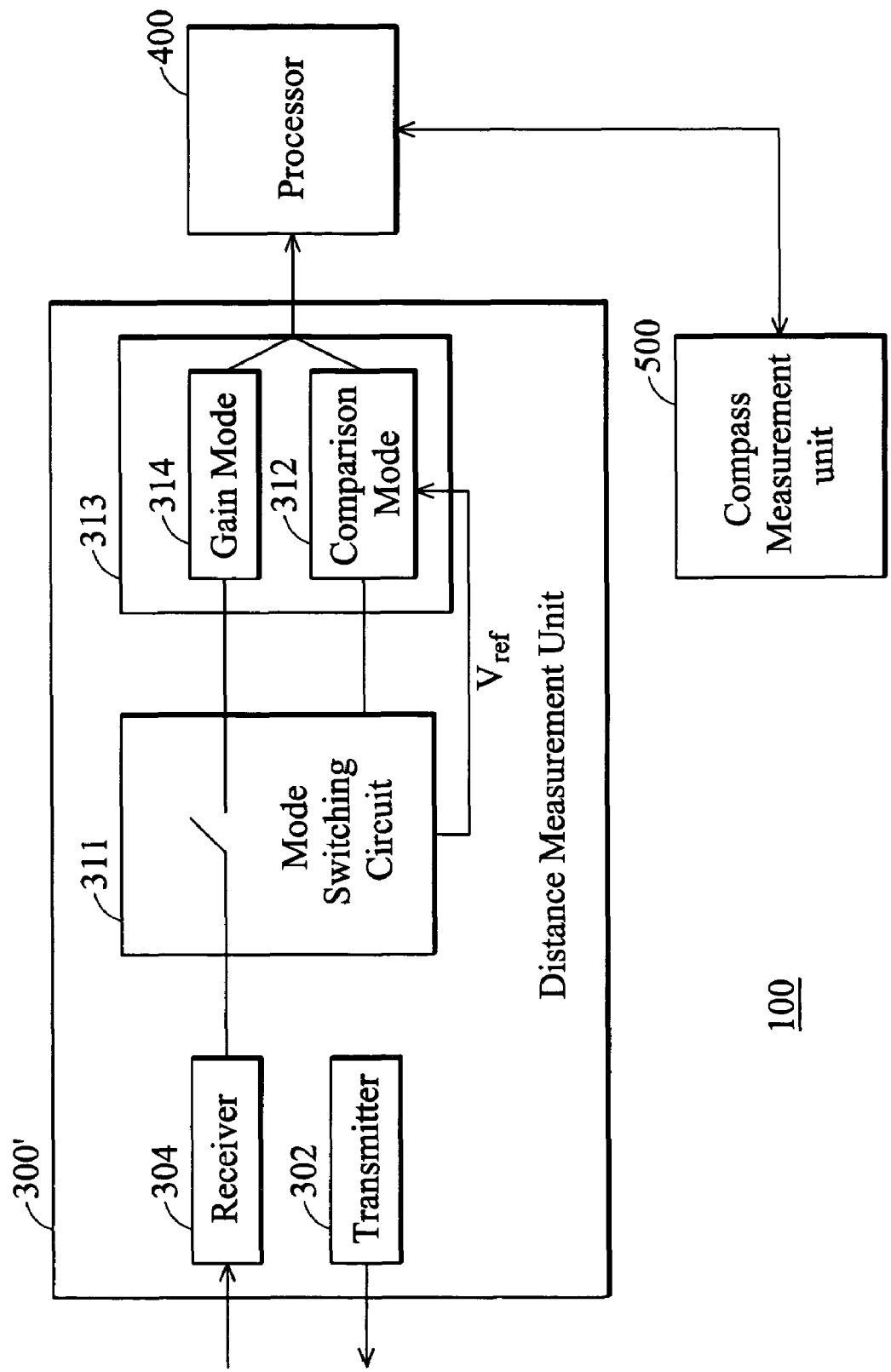
FIG. 3b is a block diagram of the rangefinder according to the flowchart shown in FIG. 2.

FIG. 3b is another block diagram of the distance measurement unit according to the flowchart shown in FIG. 2. As shown in FIG. 3b, the distance measurement unit 300' includes a transmitter 302, a receiver 304, a mode switching circuit 311 and a comparison/gain device 313. The transmitter 302 transmits pulse light beams to a target, and the target reflects the pulse light beams. The receiver 304 receives the pulse light beams reflected from the target, and outputs corresponding distance signals to the comparison/gain device 313 through the mode switching circuit 311.

Initially, the distance measurement unit 300' assumes that the distance between the target and the device is within 30 meters. The mode switching circuit 311 sets the comparison/gain device to operate in a comparison mode 312, and provides a reference voltage $V_{ref}$ to the comparison/gain device 313. Thus, the distance signal output from the receiver 304 is transferred to the comparison/gain device 313 operating in the comparison mode 312 through the mode switching circuit 311. The mode switching circuit 311 enables comparison/gain device 313 to operate in a gain mode 314 and to process the distance signal output from the receiver 304 when the distance between the rangefinder and the target cannot be measured in the comparison mode.

Figure 6A:
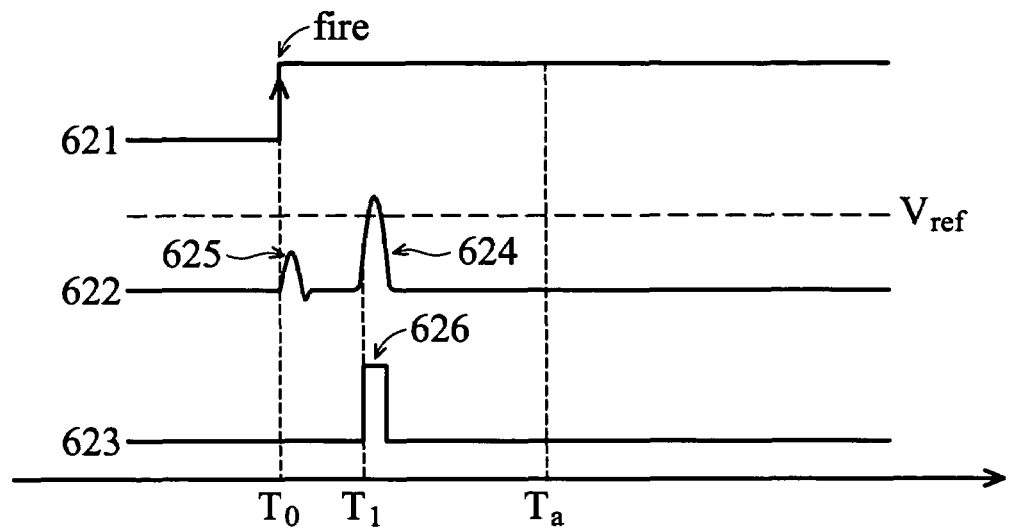
FIG. 6a is a timing chart output from the comparison/gain device.

During operation in comparison mode 312, the mode switching circuit 311 provides a reference $V_{ref}$ to the comparison/gain device 313. The reference voltage level $V_{ref}$ is slightly higher than spike noise. The spike noise is produced when pulse signal transmitted from the transmitter 302. Consequently, the spike noise can be eliminated by the comparison/gain device 313. FIG. 6a is a timing chart output from the comparison/gain device.

As shown in FIG. 6a, the signal 621 is a pulse signal transmitted to the target from the transmitter 302 at time T0. The distance signal 622 has a spike noise 325 after time T0. The comparison/gain device 313 receives the distance signal 622 and outputs the signal 623. Namely, the signal 623 is the output wave of the comparison/gain device 313 after receiving the distance signal 622. In the comparison mode 312, pulses smaller than the reference voltage level $V_{ref}$ can be eliminated by the comparison/gain device 313 when the distance between the target and the rangefinder is within 30 meters. Consequently, the signal 623 only includes pulse 624 without spike noise 625. The pulse light beam reflected from the target can maintain considerable energy intensity if the distance between the target and the rangefinder is within 30 meters. Thus, the distance signal 622 output from the receiver 304 may have a target pulse 624 higher than the reference voltage level $V_{ref}$.

Initially, the mode switching circuit 311 enables the comparison/gain device 313 to operate in a comparison mode 312 and to output the signal 623 to the processor 400. Consequently, the processor 400 determines whether a reflected pulse light beam from the target is received by the receiver 304 during time $T_a$, and calculates the distance between the target and the rangefinder. The processor 400 enables the comparison/gain device 313 to operate in a gain mode 314 when the comparison/gain device 313 has no output or the processor 400 cannot obtain the distance between the target and the rangefinder.

Figure 6B:
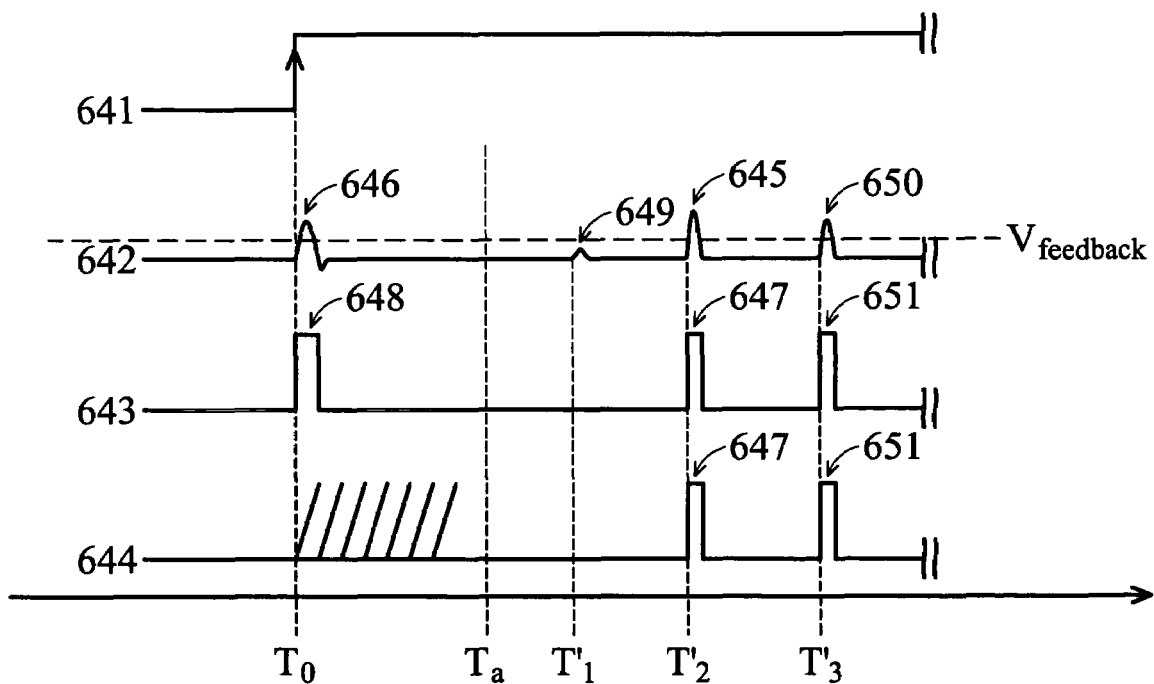
FIG. 6b is another timing chart output from the comparison/gain device.

In the gain mode 314, the comparison/gain device 313 has a feedback voltage level $V_{feedback}$, wherein the feedback voltage level $V_{feedback}$ is provided from the output of the comparison/gain device 313, and the feedback voltage level $V_{feedback}$ is smaller than the reference voltage level $V_{ref}$. The comparison/gain device 313 gains the pulses therethrough non-linearly in the gain mode 314. FIG. 6b is a timing chart output from the comparison/gain device 313. The flight time of pulse light beam between the target and the rangefinder will exceed time $T_a$ if the distance between the target and the rangefinder exceeds 30 meters. As shown in FIG. 6b, the signal 641 is a pulse signal transmitted to the target from the transmitter 302 at time $T_0$. The distance signal 642 has a spike noise 646 in the proximity of time $T_0$, and the pulses 649, 645 and 650 occur in the distance signal at time $T'_1$, $T'_2$ and $T'_3$ sequentially. The pulse 649 is eliminated by the comparison/gain device 313 because the peak voltage of the pulse 649 is smaller than the feedback voltage level $V_{feedback}$ when the distance signal 642 goes through the comparison/gain device 313. The pulses 645 and 650 and the spike noise 646 are amplified non-linearly by the comparison/gain device 313. The comparison/gain device 313 receives the distance signal 642 and outputs the signal 643. Namely, the signal 643 is the output wave of the comparison/gain device 313 after receiving the distance signal 642. The square waves 648, 647 and 651 are amplifications of the spike noise 646 and the pulses 645 and 650, wherein the square waves 648, 647 and 651 have the same peak voltage level. The signal 643 output from comparison/gain device 313 is transferred to the processor 400 for calculation of the distance between the target and the rangefinder. In the present invention, the processor 400 accumulates the amplified signal 643 corresponding to the pulse light beams by statistical operation so as to distinguish between the pulse light beam reflected from the target and environment light. During the statistical operation, the processor 400 eliminates the square wave produced before time Ta automatically, such as square wave 648, and calculates the signal 644.

Figure 7:
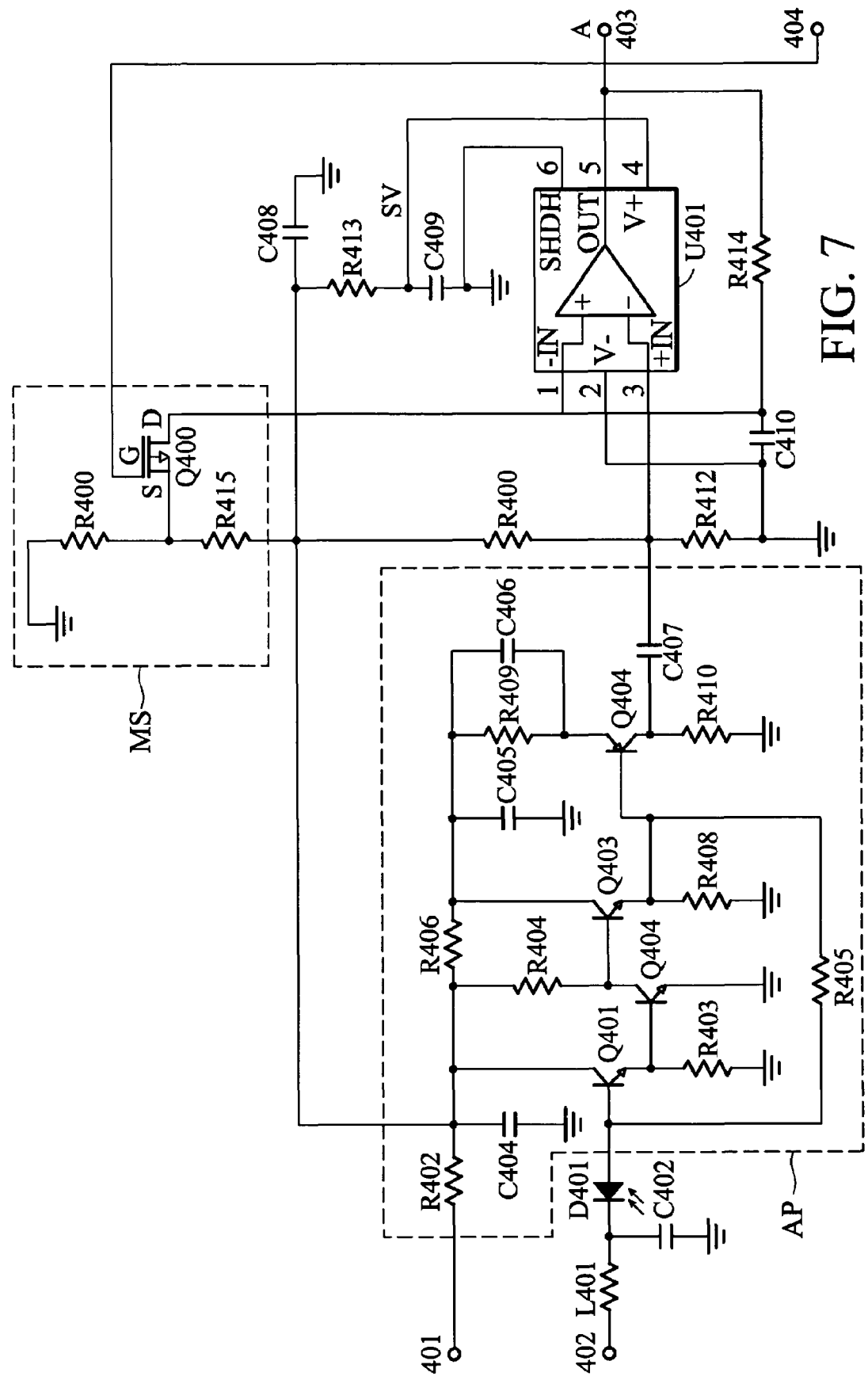
FIG. 7 is a circuit diagram of the light signal receiving device shown in FIG. 3b.

FIG. 7 is a circuit diagram of the rangefinder 300' shown in FIG. 3b. As shown in FIG. 7, the rangefinder 300' comprises a photoelectric detector D401, amplification circuit AP, a mode switching circuit MS and a comparison/gain device U401. The photoelectric detector D401 receives the light beams reflected from the target, and outputs corresponding distance signals to the amplification circuit AP. The amplification circuit AP amplifies and outputs the distance signals to the comparison/gain device U401. The operating mode of the comparison/gain device U401 is switched by the mode switching circuit MS. The mode switching circuit MS provides a reference voltage $V_{ref}$ to the terminal 1 of the comparison/gain device U401 when the comparison/gain device U401 is switched to operate in comparison mode. Consequently, the comparison/gain device estimates pulses smaller than the reference voltage level $V_{erf}$ in the distance signal and outputs only the pulses higher than the reference voltage level $V_{erf}$ in the distance signal. Typically, the mode switching circuit MS provides a reference voltage level $V_{ref}$ to the comparison/gain device U401 and enables the comparison/gain device U401 to operate in comparison mode. The mode switching circuit MS switches the comparison/gain device U401 to operate in a gain mode 314 when the comparison/gain device U401 has no output or the processor cannot obtain the distance between the target and the rangefinder by processing the peak voltage level from the comparison/gain device U401. At this time, the mode switching circuit MS stops to provide the reference voltage level to the terminal 1 of comparison/gain device U401. The terminal 1 receives a feedback voltage level $V_{feedback}$ from of the comparison/gain device U401 when the comparison/gain device U401 is switched to operate in gain mode. Consequently, the pulses smaller than the feedback voltage level in the distance signal can be eliminated in the gain mode, and the remaining pulses in the distance signal are amplified non-linearly by the comparison/gain device U401.

Also, in this embodiment, the compass measurement unit 500, as sown in FIG. 8, senses the terrestrial magnetism to obtain two compass sensing signals for measuring the compass orientation of the target. The two magnetic induction devices $X_m$ and $Y_m$ sense the terrestrial magnetism to output first and second compass sensing signals. The first and second compass signals are output to the processor 400 to determine the compass orientation of the target. Finally, the processor 400 outputs the determined compass orientation and the calculated distance between the target and the rangefinder to display on a display unit (not shown).

It should be noted that, while, in the above embodiments the rangefinder is operated in short-distance mode when the target distance from the rangefinder is within 30 meters, the invention is not limited to thereto. This distance, however, can be adjusted by the rangefinder, and different rangefinders can define different distances from which to operate in short-distance mode.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rangefinder capable of compass measurement, comprising:
   a transmitter transmitting a light beam to a target;
   a receiver receiving a light beam reflected from the target and outputting a corresponding distance signal;
   a comparison/gain device receiving the distance signal and processing the distance signal in a comparison mode or in a gain mode;
   a mode switching device controlling the comparison/gain device to operate in one of the comparison mode and the gain mode, wherein the mode switching device provides a reference voltage to the comparison/gain device to determine whether a pulse is higher than the reference voltage when the comparison/gain device is operated in the comparison mode, and the comparison/gain device produce a feedback voltage and amplifies the distance signal to output an amplified signal when the comparison/gain device is operated in the gain mode;
   a compass measurement unit sensing a terrestrial magnetism to obtain first and second magnetic sensing signals; and
   a processor estimating a distance between the target and the rangefinder according to the pulse or the amplified signal and determining a compass orientation of the target according to the first and second magnetic sensing signals.

2. A rangefinder capable of compass measurement, comprising:
   a transmitter transmitting a light beam to a target;
   a receiver receiving the light beam reflected from the target and outputting a corresponding distance signal;
   a comparison circuit comprising a reference voltage level and receiving the distance signal to determine whether a pulse is higher than the reference voltage level, in the distance signal;

a gain circuit receiving the distance signal from the receiver to amplify and output a corresponding amplified signal;

a compass measurement unit sensing a terrestrial magnetism to obtain first and second magnetic sensing signals;

a processor estimating a distance between the target and the rangefinder according to the pulse or the amplified signal and determining a compass orientation of the target according to the first and second magnetic sensing signals; and a channel selection circuit selectively outputting one of the pulse from the comparison circuit and the amplified signal from the gain circuit to the processor, according to a channel selection signal.

3. The rangefinder as claimed in claim 2, wherein the gain circuit comprises a feedback voltage level from an output terminal of the gain circuit.

4. A measuring method for a rangefinder capable of compass measurement, comprising:

transmitting a light beam to a target;

receiving another light beam reflected from the target and outputting a first distance signal, wherein the first distance signal has at least one pulse;

eliminating pulses smaller than a reference voltage level in the first distance signal and determining whether a pulse is higher than the reference voltage level in the first distance signal without processing by a gain circuit;

outputting the pulse to a process to execute operational process for estimating distance between the target and the rangefinder when a pulse is higher than the reference voltage level in the first distance signal;

repeating transmission and receiving to obtain a second distance signal when, in the first distance signal, no pulse is higher than the reference level;

amplifying the second distance signal for output to the processor to execute the operational process for estimating distance between the target and the rangefinder;

sensing a terrestrial magnetism to obtain first and second magnetic sensing signals;

determining a compass orientation of the target according to the first and second magnetic sensing signals;

displaying the estimated distance between the target and the rangefinder and the determined compass orientation of the target on a display unit.

5. The measuring method as claimed in claim 4, wherein pulses smaller than the reference voltage level are eliminated by a comparison/gain device operating in a comparison mode.

6. The measuring method as claimed in claim 5, wherein the second distance signal is amplified in a gain mode by the comparison/gain device.

7. The measuring method as claimed in claim 6, wherein the gain circuit amplifiers the second distance signal non-linearly.

8. The measuring method as claimed in claim 6, further comprising switching the comparison mode or the gain mode by a mode switching circuit.

9. The measuring method as claimed in claim 4, wherein the pulses smaller than the reference voltage level are eliminated by a comparison circuit.

10. The measuring method as claimed in claim 9, wherein the second distance signal is amplified by a gain circuit.

11. The measuring method as claimed in claim 10, wherein the gain circuit amplifiers the second distance signal non-linearly.

12. The measuring method as claimed in claim 10, further comprising selectively receiving one of the determined pulse from comparison circuit and the amplified second distance signal from the gain circuit by a channel selection circuit.

* * * * *